United States Patent
Maertens et al.

(10) Patent No.: US 7,688,333 B2
(45) Date of Patent: Mar. 30, 2010

(54) METHOD AND/OR APPARATUS FOR COLOR SPACE REDUCTION FOR TRANSCODING SUBPICTURE ELEMENTS

(75) Inventors: Gregory R. Maertens, Milan (IT);
Diego Vianello, Mestre-Venezia (IT)

(73) Assignee: LSI Corporation, Milpitas, CA (US)

( * ) Notice: Subject to any disclaimer, the term of this patent is extended or adjusted under 35 U.S.C. 154(b) by 447 days.

(21) Appl. No.: 11/712,113

(22) Filed: Feb. 28, 2007

(65) Prior Publication Data

US 2008/0204472 A1    Aug. 28, 2008

(51) Int. Cl.
G09G 5/02 (2006.01)
G06K 9/00 (2006.01)
G06K 9/34 (2006.01)
G06F 15/00 (2006.01)
H04N 1/46 (2006.01)

(52) U.S. Cl. .................. 345/601; 345/589; 345/591; 345/604; 345/549; 348/488; 358/515; 382/162; 382/165

(58) Field of Classification Search ......... 345/589–591, 345/593, 597, 600–601, 604, 629–630, 639, 345/549; 348/488, 496; 358/515, 518–519; 382/162–165, 167, 254

See application file for complete search history.

(56) References Cited

U.S. PATENT DOCUMENTS

| | | | | |
|---|---|---|---|---|
| 5,243,444 A | * | 9/1993 | Fan | 358/3.08 |
| 5,416,848 A | * | 5/1995 | Young | 382/191 |
| 5,524,746 A | * | 6/1996 | Massen et al. | 198/443 |
| 5,583,666 A | | 12/1996 | Ellson et al. | 358/518 |
| 6,647,141 B1 | * | 11/2003 | Li | 382/162 |
| 6,961,462 B2 | * | 11/2005 | Watanabe et al. | 382/164 |
| 2002/0159081 A1 | * | 10/2002 | Zeng | 358/1.9 |
| 2002/0176622 A1 | * | 11/2002 | Watanabe et al. | 382/165 |
| 2004/0036765 A1 | * | 2/2004 | Manbeck et al. | 348/96 |
| 2006/0159431 A1 | * | 7/2006 | Ando et al. | 386/95 |
| 2006/0255585 A1 | * | 11/2006 | Juratovac et al. | 283/39 |
| 2009/0153659 A1 | * | 6/2009 | Landwehr et al. | 348/135 |

* cited by examiner

*Primary Examiner*—Wesner Sajous
(74) *Attorney, Agent, or Firm*—Christopher P. Maiorana, PC

(57) ABSTRACT

An apparatus including a first circuit, a second circuit and a third circuit. The first circuit may be configured to collect color statistics. The second circuit may be configured to sort colors based upon the color statistics collected by the first circuit. The third circuit may be configured to generate a mapping function between the sorted colors and a color space of a receiving standard.

24 Claims, 5 Drawing Sheets

METHOD AND/OR APPARATUS FOR COLOR SPACE REDUCTION FOR TRANSCODING SUBPICTURE ELEMENTS

FIELD OF THE INVENTION

The present invention relates to video coding generally and, more particularly, to a method and/or apparatus for color space reduction for transcoding subpicture elements.

BACKGROUND OF THE INVENTION

Broadcasted overlay graphics are used for a wide variety of purposes. Among them, the most popular one is subtitling. Various methods exist to encode subtitles: text strings or compressed bitmaps. The number of colors used can vary by the type of application or the standard used. There is a growing need for transcoding between different audio/video standards: for archiving, transmitting or converting to a different physical media. However, different standards do not always offer the same features. In particular, in the context of subpicture elements, standards vary by the maximum color bit depth allowed.

Transmitted subtitles are quite often encoded using more bits than a destination standard can support. For example, a common broadcast standard uses 4 bits per pixel for subtitle, whereas a common storage standard uses only 2 bits per pixel. Another problem is that often destination colors cannot be chosen from a complete color space (usually, 3 components with range 0~255). Instead, a fixed color palette is used, restricting possibilities for obtaining a good approximation of the original colors.

A DVD recorder can have a tuner capable of decoding a DVB broadcasted signal. The DVB program can include video, audio and subtitles. The DVB program is decoded, transcoded and then recorded on a DVD-VR disc. Focusing on the subtitling system, the Digital Video Broadcasting (DVB) standard for subtitling systems (ETSI EN 300 743 v1.2.1(2002-10)) allows subtitle displays with different regions. Each region can have different colors from each other region. For example, a single display can have up to 256 colors. Moreover, the colors in a particular display can be totally different from a previous display and a next display.

In contrast to the DVB standard, the DVD-VR (DVD Video Recording) standard (DVD specification for Rewritable/Re-recordable Discs, Part 3, VIDEO RECORDING, Version 1.0, September 1999) allows subpicture elements to have up to four colors, chosen from a sixteen color palette. Although the sixteen color palette can be selected from a complete color space, the sixteen color palette is fixed when recording begins.

It would be desirable to have an efficient, fast and reliable method of reducing a color space for transcoding subpicture elements to match criteria of a particular standard.

SUMMARY OF THE INVENTION

The present invention concerns an apparatus including a first circuit, a second circuit and a third circuit. The first circuit may be configured to collect color statistics. The second circuit may be configured to sort colors based upon the color statistics collected by the first circuit. The third circuit may be configured to generate a mapping function between the sorted colors and a color space of a receiving standard.

The objects, features and advantages of the present invention include providing a method and/or apparatus for color space reduction for transcoding subpicture elements that may (i) collect color statistics during a decoding process, (ii) determine a number of used colors, (iii) sort a number of colors in a source stream according to the color statistics collected, (iv) associate a number of colors in a source stream with a number of colors allowed by a target standard, (v) provide a scalable solution, (vi) be independent of technology and standards, (vii) be applied to digital video broadcast (DVB) subtitles, (viii) be applied to Teletext subtitles and/or (ix) build color map tables.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

In one example, an incoming (or source) overlay graphic (e.g., subtitle(s) to be transcoded) may have a color bit-depth of M bits, while a target (or destination) standard (e.g., to which the overlay graphic is to be transcoded) may have a color bit-depth of N bits, where M>N. The case where M is less than or equal to N does not produce a problem. The number of colors potentially used in the source is generally $2^M$. The number of colors available in the target standard is generally $2^N$. In one example, the source overlay graphic may comprise subtitles compliant with the Digital Video Broadcasting (DVB) standard for subtitling systems (ETSI EN 300 743 v1.2.1(2002-10). In another example, the source overlay graphic may comprise subtitles compliant with a Teletext standard (ETSI EN 300 472, ETSI EN 300 706, etc.).

In the context of a DVD recorder with a tuner capable of decoding a DVB broadcast, the number of source colors may be up to 256 (e.g., an 8-bit color bit-depth) and the number of destination colors may be 4 (e.g., 2-bit color bit-depth). The destination colors may be picked from a 16-color palette defined at the start of recording. The palette generally cannot be optimized for a specific subtitle stream. For example, information about the colors in displays in the stream is generally not available at any one point of the stream, since DVB subtitle colors are dynamically defined for each display. In general, the DVD subtitle color palette should be chosen in order to best fit all colors of a complete color space. The present invention generally provides a method and/or apparatus that may determine the $2^N$ most significant colors among the $2^M$ colors available in the source stream and approximate other pixel colors in addition to the $2^N$ most significant colors using the $2^N$ most significant colors.

Figure 1:
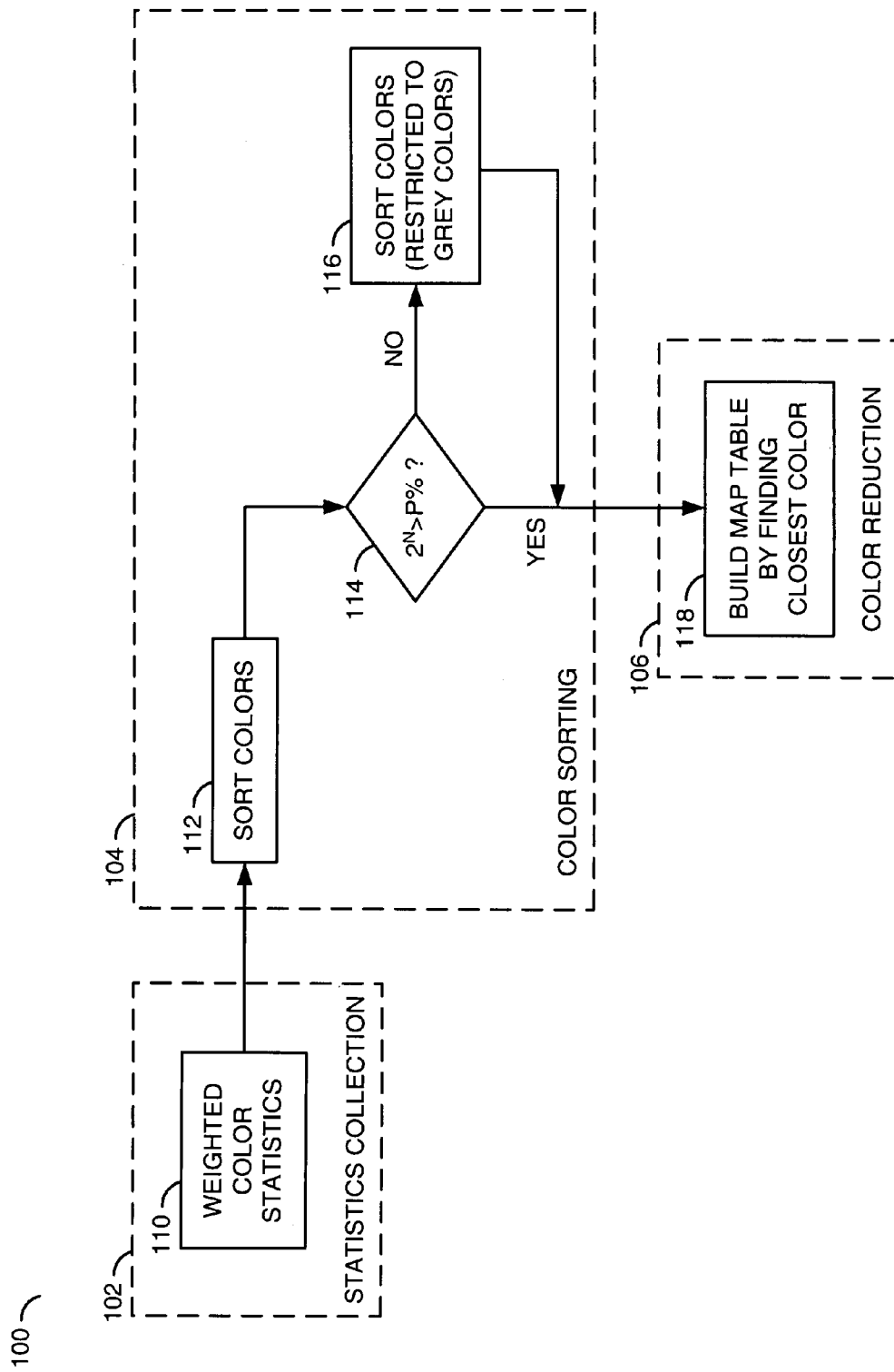
FIG. 1 is a block diagram illustrating a color space reduction process in accordance with the present invention.

Referring to FIG. 1, a block diagram of a process 100 is shown in accordance with a preferred embodiment of the present invention. The process 100 may comprise a block (or state) 102, a block (or state) 104 and a block (or state) 106. The state 102 may comprise a statistics collecting state. The state 104 may comprise a color sorting state. The state 106 may comprise a color reduction state. The color statistics (e.g., number of pixels having particular colors) collected in the state 102 may be presented to an input of the state 104. The state 104 may sort the colors according to the statistics received from the state 102. The state 104 may have an output that may present the sorted colors to an input of the state 106. The state 106 may generate a map (or look-up) table relating the source and destination colors.

In one example, the statistics collected in the state 102 may comprise weighted color statistics 110. During decoding of the source overlay graphic, statistics for all pixels are generally collected. For example, the number of pixels painted in each used color among the $2^M$ colors may be determined (e.g., in a histogram) At the end of decoding (and then collecting) un-used colors are generally not represented in the statistics. For example, by not collecting statistics concerning the un-used colors, resources (e.g., memory space and computation power) may be saved in later steps.

In general, collecting the statistics while decoding rather than by analyzing an already decoded bitmap may make the whole process much more efficient and fast, especially for large graphics. For example, collecting statistics during decoding may take advantage of the particular encoding technique used to encode the data in the stream. In contrast, collecting statistics using the decoded bitmap generally involves a pixel by pixel analysis that may waste CPU time.

In the example of the DVB stream, the subtitles are encoded with an RLE technique that allows adding whole sequences of pixels to the statistics, without parsing the pixels one by one to check color, finding a particular pixel in a statistics table and incrementing the entry for the particular pixel. For example, colors may be indexed, so pixel value is actually an entry in a color look-up table (CLUT).

The block 104 may comprise a block (or state) 112, a block (or state) 114 and a block (or state) 116. The block 112 may be implemented as a color sorter block (or process). The block 114 may be implemented as a decision block. The block 116 may be implemented as a grey scale color sorter block (or process). The weighted color statistics 110 collected in the block 102 may be received at an input of the state 112. The state 112 may be configured, in one example, to sort colors based upon the weighted color statistics. In one example, the colors may be sorted in order of decreasing occurrence.

When the colors have been sorted in the state 112, the process 100 may move to the state 114. In the state 114, the process 100 may determine whether the first $2^N$ colors in the source overlay display is greater than a predetermined percentage (e.g., P %) of a total number of pixels in the overlay graphic. When the first $2^N$ colors of the sorted list are greater than the predetermined percentage of total pixels in the overlay graphic, the process 100 may move to the state 106. When the first $2^N$ colors of the sorted list are less than or equal to the predetermined percentage P % of the total number of pixels in the overlay graphic, the process 100 may move to the state 116.

In the state 116, only grey scale colors, including white, black and transparent, of the statistics table are taken into account. For example, in the state 116 all colors may be approximated to grayscale colors. In one example, the state 116 may be implemented by considering only a luminance (or luma) component of the colors. When the colors have been sorted according to grayscale, the process 100 may move to the state 106. In the state 106, the process 100 may perform a process 118 that builds a map table by determining the closest colors in the target standard to the colors received from the block 104.

The statistics received from the block 102 may be used to sort colors used in the overlay graphic (e.g., up to, but often less than, $2^M$) from the most used color to the least used color. In one example, destination colors may be limited and cannot be chosen arbitrarily from a complete color space. In such a case, during the sorting each source color in the statistics table may be converted to the best fitting among all possible destination colors. The conversion may further reduce the statistics table, because some colors may become the same. If the conversion operation is performed later (e.g., after color reduction) the result may be the same, but with less efficiency and memory savings.

In the example of DVB subtitle to DVD subpicture transcoding, destination colors may be chosen only from 16 already defined colors. Before performing color sorting, similarities between source colors and destination colors may be evaluated. Even if the maximum number of source colors is used (e.g., 256), after evaluating the similarities a table with at most 16 color may be found, with greater improvement of efficiency and space savings.

When the colors have been sorted, the first $2^N$ colors of the sorted list are examined. When the first $2^N$ colors of the sorted list represent more than P % of the total number of pixels in the overlay graphic, the first $2^N$ colors of the sorted list become the reference colors. When the first $2^N$ colors of the sorted list represent less than P % of the total number of pixels in the overlay graphic, only grey colors (including white, black and transparent, if present) of the statistics table may be taken into account, and up to $2^N$ (depending of number of grey destination colors) most used gray colors selected as the reference colors. The switch to grayscale colors may be referred to as a 'panic mode'. The panic mode may be used where there is no apparent choice for choosing colors. In the panic mode, all colors may be approximated to gray colors. Approximating the colors to gray colors is generally equivalent to considering only the luma component of colors. In general, the value P may be set depending on the application. The value P may be fine tuned to provide the best reliability, in terms of resemblance between source and destination display.

Applying the above process to the DVB to DVD-VR example, after the transcoder has sorted the source colors, when the number of pixels using the first four colors represent more of P % of total pixels in the overlay graphic, the four colors are simply taken as the best colors, and may be used to encode the subtitle display in subpicture format. When the number of pixels using the first four colors represent less of P % of the total pixels in the overlay graphic, a new selection may be made (e.g., the most used gray colors may be selected). The newly selected colors become the new reference colors to encode the subpicture (e.g., resulting in a colorless subpicture, despite the original subtitle display being in color). For a typical subtitle display, the panic mode may result in almost black and white subpictures, because often white, black and transparent are always present, so at most one grey level is available (if present in the DVD color palette).

When the reference colors have been selected, the other colors in the statistics table may be adjusted to obtain a best fit. A map table may be built to translate the $2^M$ colors into the $2^N$ reference colors found during color sorting process. A process for generating the map table may be implemented, in one example, as follows. A first variable (e.g., $C_x$) representing used source colors may be implemented, where $C_i$ represents the $i^{th}$ color to be mapped. A second variable (e.g., $CREF_x$) representing possible destination (or reference) colors may be implemented, where $CREF_j$ represents the $j^{th}$ reference color. The first variable may have an index (e.g., i) that may vary from zero to $2^M-1$ (e.g., i=[0, $2^M-1$]). The second variable may have an index (e.g., j) that may vary from zero to $2^N-1$ (e.g., j=[0, $2^N-1$]). In one example, the map table may be implemented as an array (e.g., $MAP_x$). The map table may be built using the following Equation 1:

$$map_i = j, \qquad \qquad EQ. 1$$

where the $j^{th}$ reference color has the minimum distance from the source color (e.g., minimum(distance($c_i$, $cref_j$)), where $j=[0,2^N-1]$) In one example, the distance function may be expressed, for colors in a YUV space (e.g., with a common triplet like {y, cr, cb}) using the following Equation 2:

$$\text{distance}(\{y_0,cr_0,cr_0\},\{y_1,cr_1,cb_1\})=SQRT((y_0-y_1)^2+(cr_0-cr_1)^2+(cb_0-cb_1)^2)$$ EQ. 2

For the reference colors, the mapping is generally direct (e.g., the distance is zero), so the entries in the map may be filled without performing the calculation. When the map table is built, the overlay graphic may be represented (transcoded) in the target bit-depth resolution.

Figure 2:
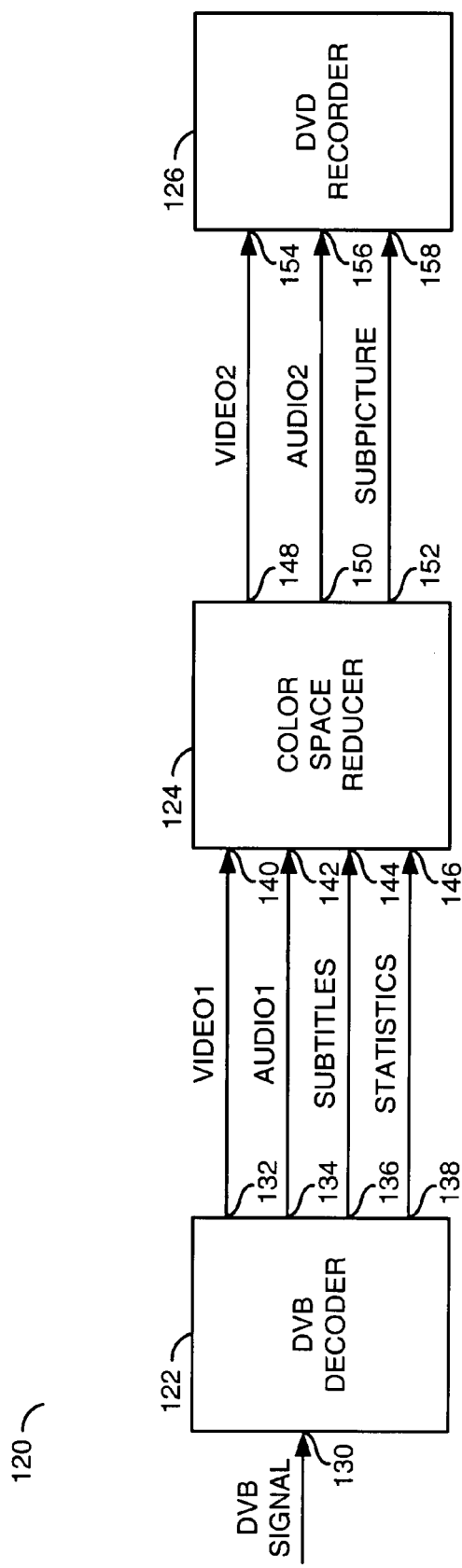
FIG. 2 is a block diagram illustrating a transcoding system in accordance with the present invention.

Referring to FIG. 2, a block diagram of a system 120 is shown illustrating an example implementation of the present invention in the context of a DVD recorder with a DVB tuner. In one example, the system 120 may comprise a block 122, a block 124 and a block 126. The block 122 may be implemented, in one example, as a digital video broadcast (DVB) decoder. The block 124 may be implemented, in one example, as a color reducer block (or circuit) The block 126 may be implemented, in one example, as a DVD recorder.

The block 122 may have an input 130 that may receive a signal (e.g., DVB SIGNAL), an output 132 that may present a signal (e.g., VIDEO1), an output 134 that may present a signal (e.g., AUDIO1), an output 136 that may present a signal (e.g., SUBTITLES) and an output 138 that may present a signal (e.g., STATISTICS). The block 122 may be configured to generate the signals VIDEO1, AUDIO1, SUBTITLES and STATISTICS in response to the signal DVB SIGNAL. The block 124 may have an input 140 that may receive the signal VIDEO1, an input 142 that may receive the signal AUDIO1, an input 144 that may receive the signal SUBTITLES, an input 146 that may receive the signal STATISTICS, an output 148 that may present a signal (e.g., VIDEO2), an output 150 that may present a signal (e.g., AUDIO2) and an output 152 that may present a signal (e.g., SUBPICTURE). The block 124 may be configured to generate the signals VIDEO2, AUDIO2 and SUBPICTURE in response to the signals VIDEO1, AUDIO1, SUBTITLES and STATISTICS. The block 126 may have an input 154 that may receive the signal VIDEO2, an input 156 that may receive the signal AUDIO2 and an input 158 that may receive the signal SUBPICTURE.

Figure 3:
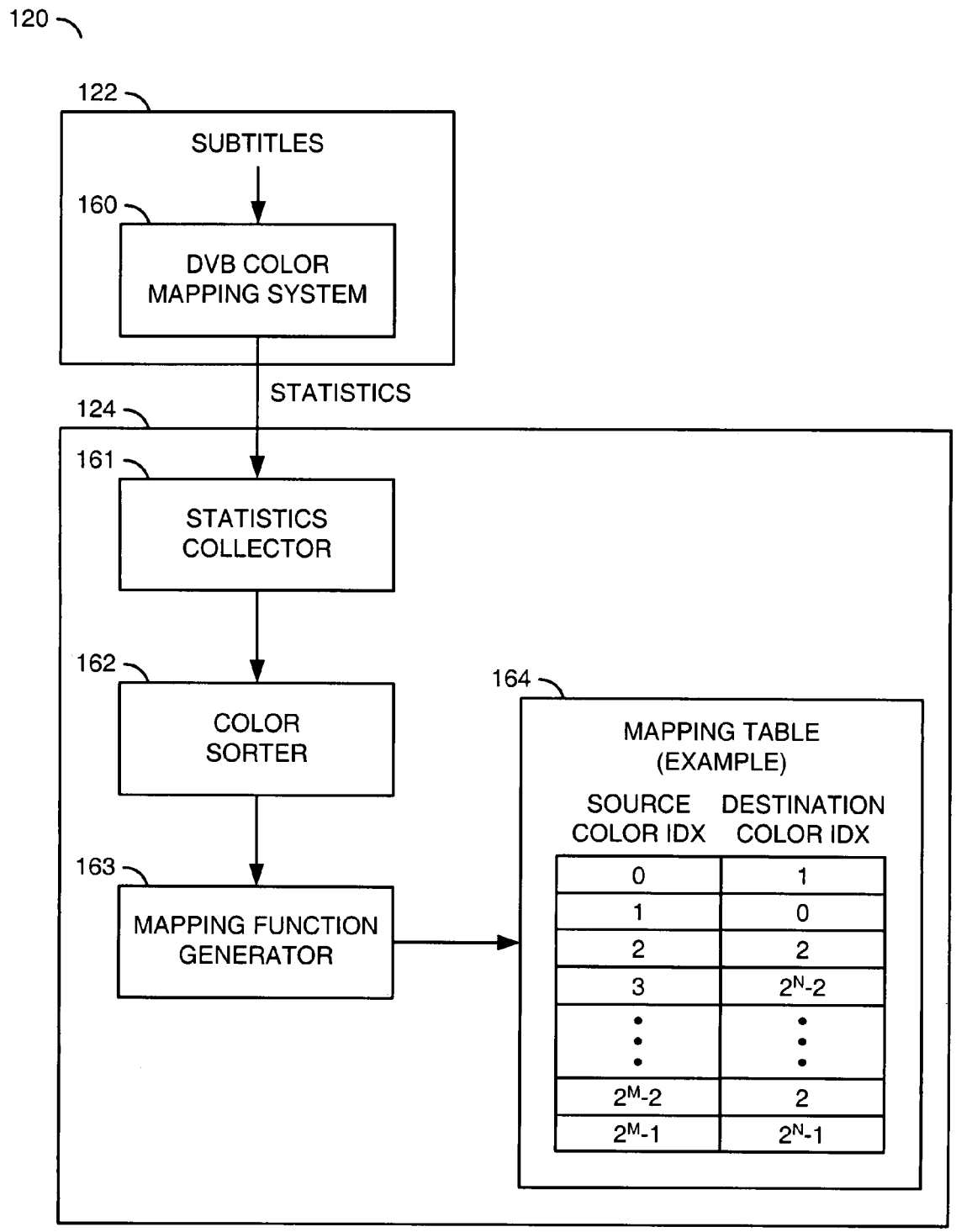
FIG. 3 is a block diagram illustrating an example of a color space reducer of FIG. 2.

Referring to FIG. 3, a block diagram is shown illustrating an example implementation of the system 120 of FIG. 2. In one example, the block 122 may comprise a block 160. The block 160 may be implemented, in one example, as a DVB color mapping system. In one example, the block 160 may be implemented in accordance with the Digital Video Broadcasting (DVB) standard for subtitling systems (ETSI EN 300 743 v1.2.1(2002-10)). In another example, the block 160 may be implemented in accordance with the Teletext standard (ETSI EN 300 472, ETSI EN 300 706). In one example, the signal SUBTITLES may be presented to an input of the block 160. The block 160 may have an output that may present the signal STATISTICS. The block 160 may generate the signal STATISTICS in response to the signal SUBTITLES. In one example, the signal STATISTICS may comprise a sequence of ordered pairs (e.g., {color, # of pixels}) generated by the DVB RLE compression process.

In one example, the block 124 may comprise a block 161, a block 162, a block 163 and a block 164. The block 161 may be implemented as a statistics collection block (or circuit). The block 162 may be implemented as a color sorter block. (or circuit) The block 163 may be implemented as a mapping function generator block (or circuit). The block 164 may be implemented as a mapping (or look-up) table. The block 161 may have an input that may receive the signal STATISTICS. The block 161 may have an output that may present a signal to an input of the block 162. The block 162 may have an output that may present a signal to an input of the block 163. The block 163 may have an output that may present a signal to an input of the block 164. In one example, the block 162 may perform the color sorting operation 104 (described above in connection with FIG. 1). In another example, the block 162 may perform a global color sorting operation (described below in connection with FIG. 5). In one example, the block 164 may be configured to associated a source color index with a destination color index based on the signal received from the block 163.

Figure 4:
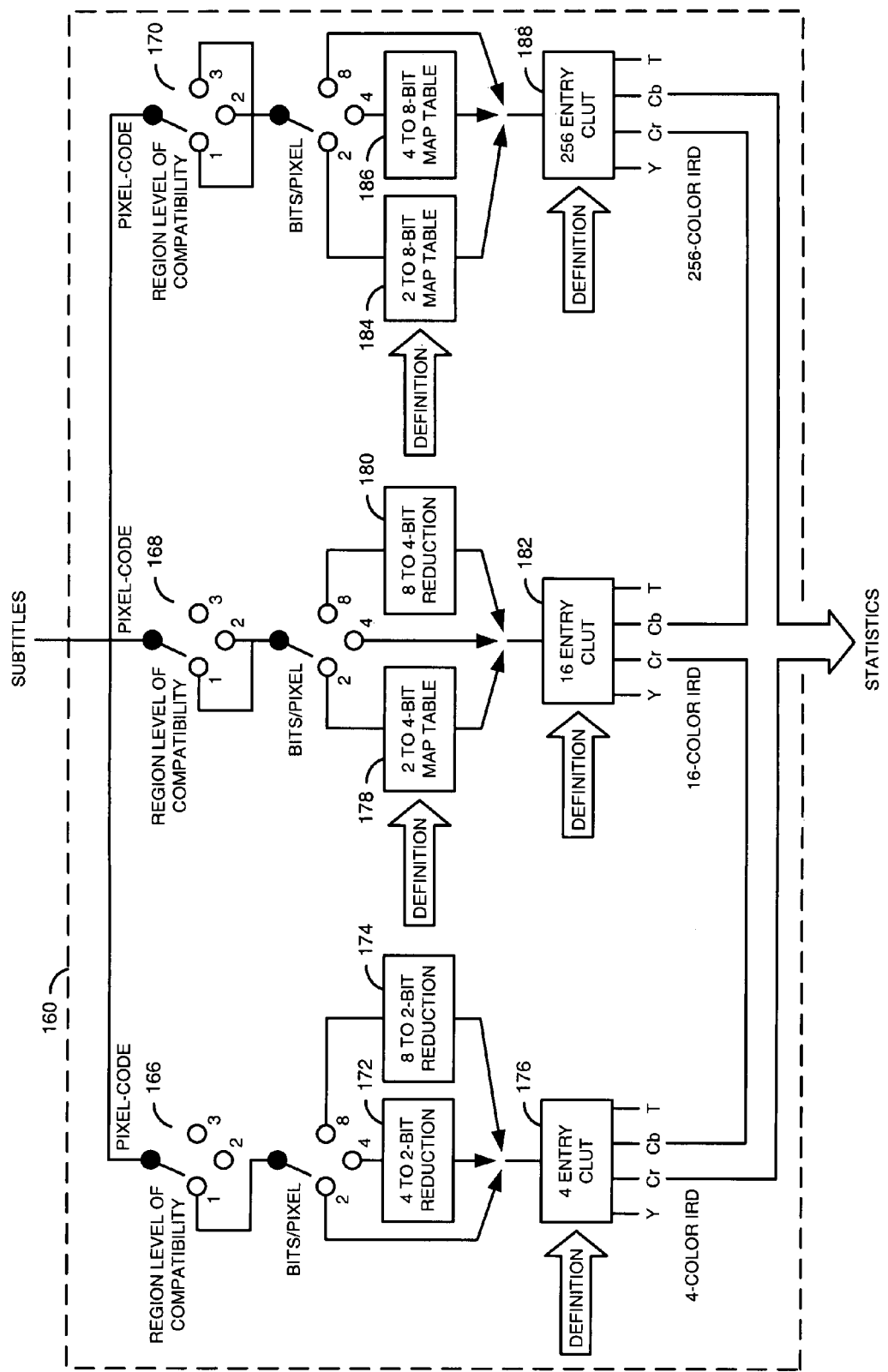
FIG. 4 is a block diagram illustrating an example of a DVB color mapping system of FIG. 3.

Referring to FIG. 4, a block diagram is shown illustrating an example implementation of the block 160. In one example, the block 160 may comprise a block (or circuit) 166, a block (or circuit) 168 and a block (or circuit) 170. The block 166 may be implemented, in one example, as a 4-color integrated receiver decoder (IRD). The block 168 may be implemented, in one example, as a 16-color IRD. The block 170 may be implemented as a 256-color IRD. The signal SUBTITLES may be presented to an input of each of the block 166, the block 168 and the block 170. In one example, the signals presented to the blocks 166, 168 and 170 may comprise pixel codes.

In one example, the block 166 may comprise a first switch, a second switch, a block 172, a block 174 and a block 176. The block 172 may be implemented as a 4-bit to 2-bit reduction block. The block 174 may be implemented as an 8-bit to 2-bit reduction block. The block 176 may be implemented as a 4 entry color look-up table (CLUT). In one example, the first switch may be configured to select a path based upon a region level of compatibility. The second switch may be configured to select a path based upon a number of bits per pixel in the pixel codes. For example, a first path may be selected when the pixel codes contain 2 bits per pixel, a second path for 4 bits per pixel and a third path for 8 bits per pixel.

The first path may comprise a direct path to the 4 entry CLUT 176. The second path may present the pixel code to an input of the block 172. The third path may present the pixel code to an input of the block 174. An output of the block 172 and an output of the block 174 may be presented to an input of the block 176. The block 176 may have outputs that may present a number of signals (e.g., Y, Cr, Cb and T).

In one example, the block 168 may comprise a first switch, a second switch, a block 178, a block 180 and a block 182. The block 178 may be implemented as a 2-bit to 4-bit map table block (or circuit). The block 180 may be implemented as an 8-bit to 4-bit reduction block. The block 182 may be implemented as a 16 entry color look-up table (CLUT). In one example, the first switch may be configured to select a path based upon a region level of compatibility. The second switch may be configured to select a path based upon a number of bits per pixel in the pixel codes. For example, a first path may be selected when the pixel codes contains 2 bits per pixel, a second path for 4 bits per pixel and a third path for 8 bits per pixel.

The first path may present the pixel code to an input of the block 178. The second path may comprise a direct path to the 16 entry CLUT 182. The third path may present the pixel code to an input of the block 180. An output of the block 178 and an output of the block 180 may be presented to an input of the block 182. The block 182 may have outputs that may present a number of signals (e.g., Y, Cr, Cb and T).

In one example, the block 170 may comprise a first switch, a second switch, a block 184, a block 186 and a block 188. The block 184 may be implemented as a 2-bit to 8-bit map table block (or circuit). The block 186 may be implemented as an 4-bit to 8-bit map table block (or circuit). The block 188 may be implemented as a 256 entry color look-up table (CLUT). In one example, the first switch may be configured to select a path based upon a region level of compatibility. The second switch may be configured to select a path based upon a number of bits per pixel in the pixel codes. For example, a first path may be selected when the pixel codes contains 2 bits per pixel, a second path for 4 bits per pixel and a third path for 8 bits per pixel.

The first path may present the pixel code to an input of the block 184. The second path may present the pixel code to an input of the block 186. The third path may comprise a direct path to the 256 entry CLUT 188. An output of the block 184 and an output of the block 186 may be presented to an input of the block 188. The block 188 may have outputs that may present a number of signals (e.g., Y, Cr, Cb and T).

The signals Y, Cr, Cb and T may be implemented, in one example, to represent luminance, complementary red, complementary blue and transparent components, respectively, of the pixel data. The signals Y, Cr, Cb and T from each of the block 166, 168 and 170 may be presented by the block 160 as components of the signal STATISTICS.

Figure 5:
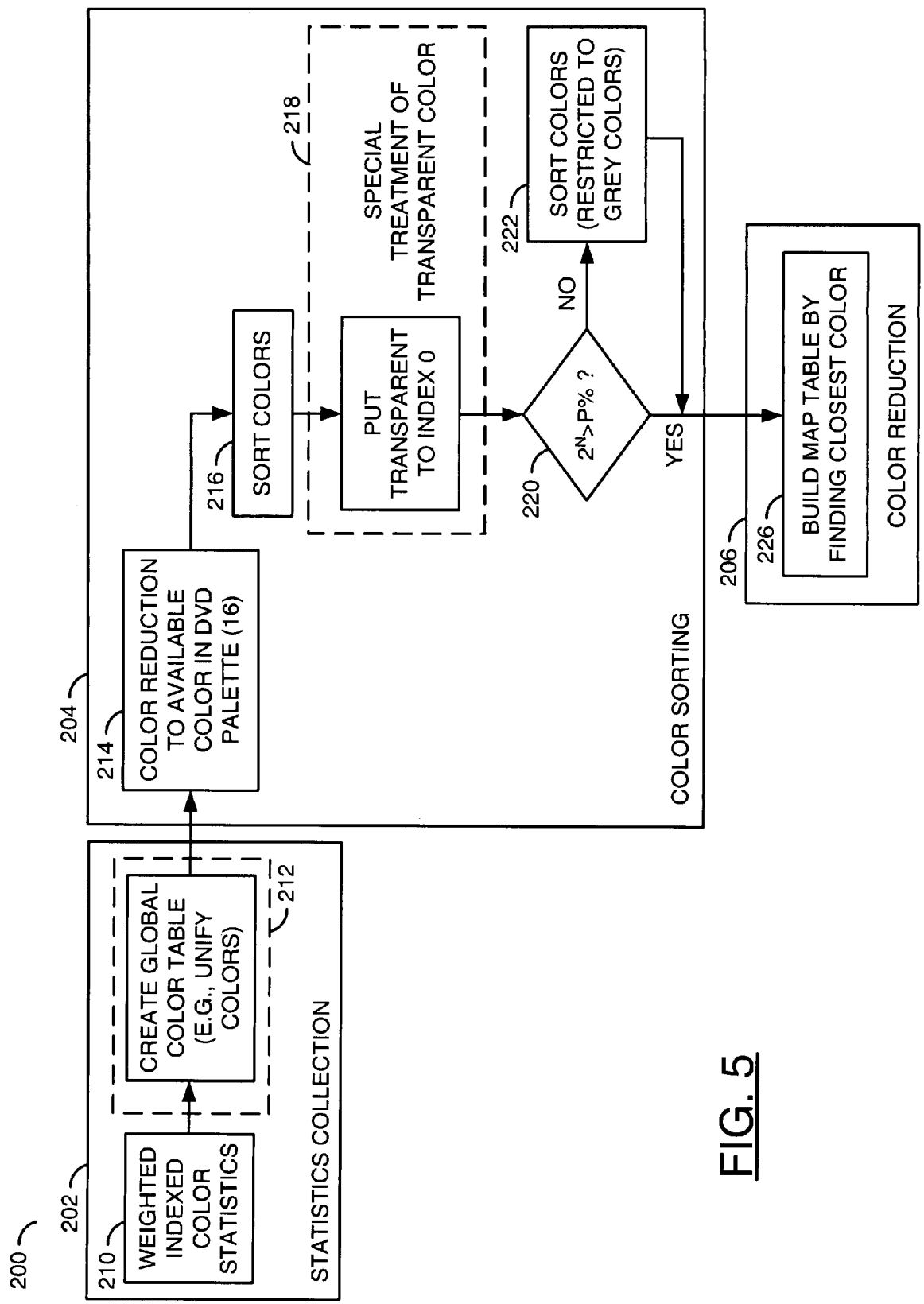
FIG. 5 is a block diagram illustrating a global color space reduction process in accordance with the present invention.

Referring to FIG. 5, a block diagram illustrating a process 200 in accordance with the present invention is shown. The process 200 may comprise a block (or process) 202, a block (or process) 204 and a block (or process) 206. The block 202 may be implemented as a statistics collection block. The block 204 may be implemented as a color sorting block. The block 206 may be implemented as a color reduction block.

In one example, the block 202 may comprise a block 210 and a block 212. The block 210 may be implemented as a weighted index color statistics block (or process). The block 212 may be implemented as a global color table creation block (or process). The block 210 may have an output that may present a signal to an input of the block 212. The block 212 may have an output that may present a global color table representing the combined colors used in all regions of the source overlay graphic.

The block 204 may comprise a block (or process) 214, a block (or process) 216, a block (or process) 218, a block (or process) 220 and a block (or process) 222. The block 214 may be implemented as a color reduction block. The block 216 may be implemented as a color sorting block. The block 218 may be implemented as a transparent color processing block. The block 220 may be implemented as a decision block. The block 222 may be implemented as a grayscale color sorting block.

The block 214 may have an input that may receive the global color table from the block 202 and an output that may present a color table with reduced colors to an input of the block 216. In one example, the reduced color table may represent the source colors reduced to the available colors in the destination (e.g., DVD-VR, etc.) palette (e.g., 16 colors).

The block 216 may have an output that may present a sorted list of colors to an input of the block 218. In one example, the colors may be sorted according to frequency of occurrence in the source overlay graphic. The block 218 may alter the order of the sorted colors based on a transparency attribute. For example, transparent color may be given an index of zero. The block 218 may have an output that may present the sorted colors to an input of the block 220.

The block 220 may be configured to determined whether to use the reference colors in the sorted list or select new grayscale reference colors based upon whether the $2^N$ most significant colors represent a predefined percentage of the total number of pixels in the source overlay. The block 220 may have a first output that may present the sorted colors to an output of the block 204 and a second output that may present the sorted colors to an input of the block 222. The block 222 may have an output that may present a sorted list of grayscale colors at the output of the block 204.

In one example, the block 214 may be configured to take a global color table generated by the block 202 and reduce the colors to the available colors in, for example, the DVD palette. For example, the colors may be reduced to 16 colors. The block 214 may present the reduced colors to the block 216.

The block 216 may be configured to sort the colors based upon occurrence in the overlay graphic. The block 216 may present the sorted colors to an input of a block 218. The block 218 may be configured to provide special treatment of any transparent colors. In one example, a transparent color may be given an index of zero. Once the transparent colors have been treated, the sorted colors may be transferred to the block 220. In the block 220, the first $2^N$ sorted colors are checked to determine whether the number of colors is greater than a predetermined percentage of the overall number of pixels in the overlay graphic. When the number of colors is not greater than the predetermined percentage of overall pixels in the overlay graphic, the process 200 may move to the block 222. When the number of colors is greater than the predetermined percentage of overall pixels in the overlay graphic, the process 200 transfers the sorted colors to the input of the block 206. In the block 222 the colors are restricted to grayscale colors and sorted. When the grayscale colors have been sorted, the sorted colors are presented to the input of a block 206. In one example, the block 206 may comprise a function for building a map table by determining a closest available color to the colors in the sorted list received from the block 204.

The present invention may be particularly useful when transcoding a DVB subtitle stream into DVD subpicture elements. The DVB subtitles encode bitmaps with up to 8 bits per pixel, whereas the DVD standard supports only up to 2 bits per pixel in its most basic form. In real-life broadcasts (e.g., in the United Kingdom), 4 bits per pixel are generally used for DVB subtitles. However, the DVB standard allows different regions in the same subtitle display, each one with a corresponding color look-up table (CLUT). Different regions may have different CLUTs.

In a preferred embodiment of the present invention, transcoding from DVB subtitle to DVD subpicture may be implemented by adding two stages to better fit the invention to the specific differences between the DVB standard and the DVD-VR standard. As described above, a subtitle display may contain different regions, each region with different colors. The regions generally have indexed color (e.g., every pixel in the region points to an entry in a corresponding CLUT for the region).

Statistics for the indexed pixels may be taken instead of for the actual colors. Then, at the transcoding stage, a global table may be constructed. The global table generally contains all univocal colors used in all regions for a given subtitle display (overlay graphic). The global colors statistics may be obtained form previous indexed pixel statistics. In one example, redirection tables may be created while the global color table is being constructed. For example, every pixel index of every region, through the redirection tables, points to a color in the global table and its statistic may be added to others already collected, preserving the efficiency of decoding stage statistic collection.

Approximation of a transparent color with any other arbitrary solid color generally produces very bad results. If transparent color is not used, black bars and other strange artifacts may be seen (e.g., depending on the subtitle) that may cover important parts of the screen. If transparent color is not used, all parts that should be transparent will be covered with a solid color (e.g., black). In one example, the transparent color may be the most used color. However, in other cases the transparent color may be discarded.

The DVD subpicture standard generally allows that only one region is presented on a given subpicture display. When a DVB subtitle display has different regions displayed, the different regions may be combined to find a smallest region that contains all of the individual regions. The spaces between regions and zones that do not belong to any region should be painted with transparent color. For all these reasons, the present invention treats transparent color as a special color, that if present (e.g., there are regions that contain transparent pixels or there are empty DVD region sections to fill) is kept as a reference color, regardless of the corresponding statistic. However, the inclusion of a transparent color regardless of statistic does not generally affect the behavior of transcoder when implementing color reduction in accordance with the present invention. For example, $2^N-1$ colors are considered instead of $2^N$ and all other consideration are generally the same.

Although the present invention has been illustrating using digital video broadcast (DVB) subtitles (ETSI EN 300 743), the present invention may also be applied to Teletext subtitles (ETSI EN 300 472 and ETSI EN 300 706).

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a first circuit configured to collect color statistics;
   a second circuit configured to sort colors based upon the color statistics collected by the first circuit; and
   a third circuit configured to generate a mapping function between the sorted colors and a color space of a receiving standard, wherein said mapping function is generated such that a distance between each sorted color and a corresponding reference color is minimized.

2. The apparatus according to claim 1, wherein said color statistics are weighted.

3. The apparatus according to claim 1, wherein said first circuit is configured to collect said color statistics during decoding of an input signal.

4. The apparatus according to claim 3, wherein the input signal comprises a digital video broadcast (DVB) compliant subtitle or a Teletext compliant subtitle.

5. The apparatus according to claim 1, wherein said first circuit is further configured to generate a global color table.

6. The apparatus according to claim 5, wherein said second circuit is further configured to reduce a number of colors in said global color table.

7. The apparatus according to claim 1, wherein said apparatus is configured to convert a digital video broadcast (DVB) compliant subtitle to a digital versatile disc video recording (DVD-VR) compliant subpicture.

8. The apparatus according to claim 1, further comprising a Digital Video Broadcast (DVB) compliant color mapping system configured to generate said color statistics.

9. The apparatus according to claim 1, wherein said second circuit is further configured to restrict a number of sorted colors to grayscale colors when a number of available destination colors is not greater than a predefined percentage of the number of pixels in a source overlay.

10. The apparatus according to claim 1, wherein said first circuit comprises:
    a first decoder configured to generate statistics for a first number of colors;
    a second decoder configured to generate statistics for a second number of colors, where said second number is greater than said first number; and
    a third decoder configured to generate statistics for a third number of colors, where said third number is greater than said second number.

11. The apparatus according to claim 5, wherein said global color table is generated based on a plurality of digital video broadcast (DVB) compliant subtitle regions.

12. The apparatus according to claim 6, wherein said number of colors in said global color table is reduced based on a digital versatile disc video recording (DVD-VR) compliant subpicture color palette.

13. An apparatus comprising:
    means for collecting weighted color statistics;
    means for sorting colors based upon the weighted color statistics collected; and
    means for generating a mapping function between the sorted colors and a color space of a receiving standard, wherein said mapping function is generated such that a distance between each sorted color and a corresponding reference color is minimized.

14. A method of color space reduction comprising the steps of:
    collecting color statistics from an input signal using a decoder;
    sorting colors based upon the color statistics collected; and
    generating a mapping function between the sorted colors and a color space of a receiving standard, wherein said mapping function is generated by associating a reference color with each sorted color such that a distance between each sorted color and the associated reference color is minimized.

15. The method according to claim 14, wherein said color statistics comprise weighted color statistics.

16. The method according to claim 14, wherein said color statistics are collected during decoding of the input signal.

17. The method according to claim 16, wherein the input signal comprises a digital video broadcast (DVB) compliant subtitle or a Teletext compliant subtitle.

18. The method according to claim 14, further comprising: generating a global color table for the input signal.

19. The method according to claim 18, further comprising: combining two or more subtitle regions of a source overlay to form a single destination overlay.

20. The method according to claim 18, further comprising: reducing a number of colors in said global color table.

21. The method according to claim 20, further comprising: assigning transparent colors an index of zero.

22. The method according to claim 14, further comprising: restricting a number of sorted colors to grayscale colors when a number of available destination colors is not greater than a predefined percentage of the number of pixels in a source overlay.

23. The method according to claim 18, wherein said global color table is generated based on a plurality of digital video broadcast (DVB) compliant subtitle regions.

24. The method according to claim 20, wherein the number of colors in said global color table is reduced based on a digital versatile disc video recording (DVD-VR) compliant subpicture color palette.

* * * * *